F. M. ASHLEY.
TRANSMISSION OF POWER.
APPLICATION FILED NOV. 26, 1902.
900,342.
Patented Oct. 6, 1908.
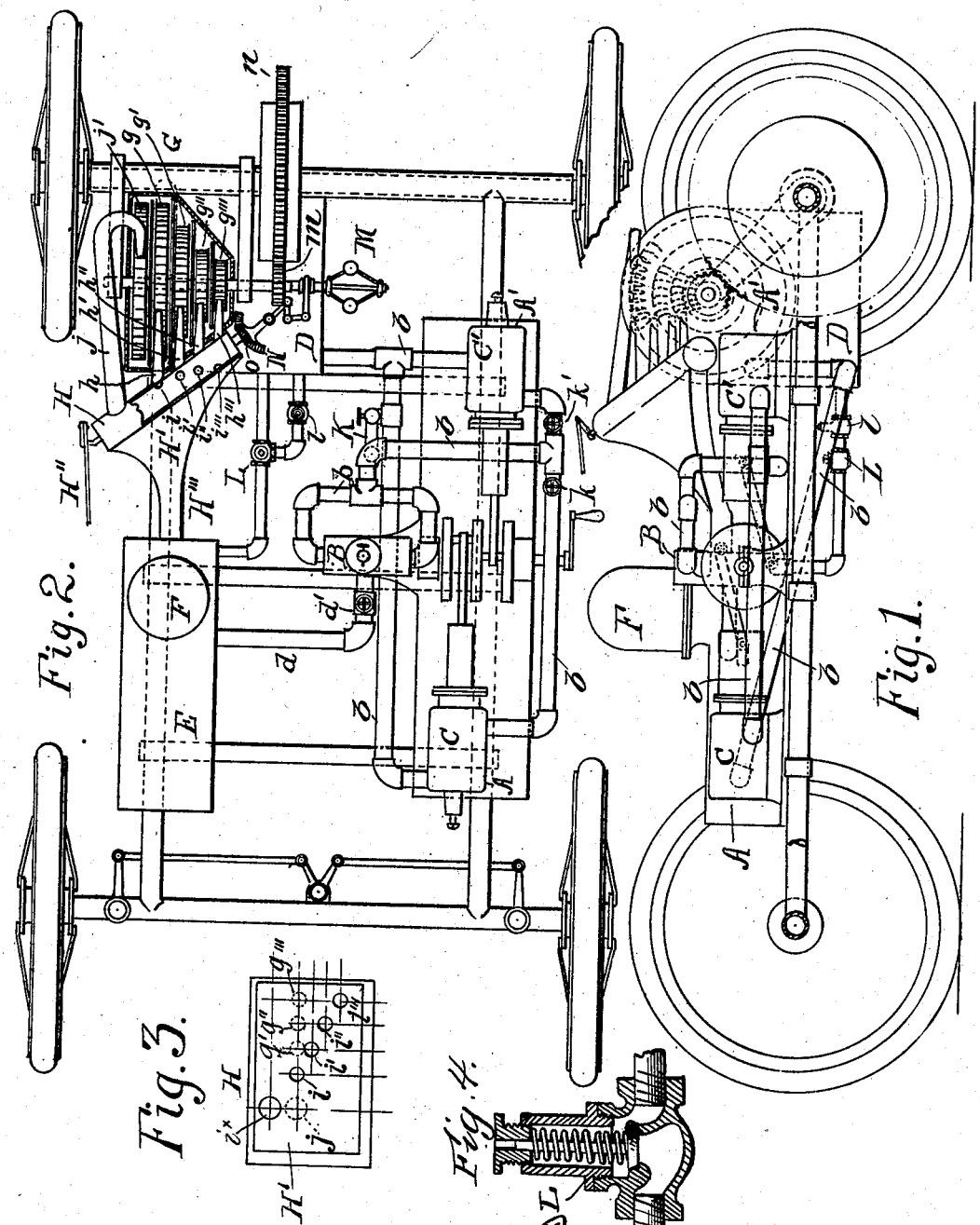

UNITED STATES PATENT OFFICE.

FRANK M. ASHLEY, OF NEW YORK, N. Y.

TRANSMISSION OF POWER.

No. 900,342.  Specification of Letters Patent.  Patented Oct. 6, 1908.

Application filed November 26, 1902. Serial No. 132,965.

*To all whom it may concern:*

Be it known that I, FRANK M. ASHLEY, a citizen of the United States, and a resident of the borough of Brooklyn, in the city of New York, county of Kings, and State of New York, have invented certain new and useful Improvements in Transmission of Power, of which the following is a specification.

My invention in the transmission of power relates generally to that class wherein the power of a prime mover is adapted to be flexibly applied to the kinetic instrumentalities of the transmission system at varying degrees of acceleration and more particularly to a system of power transmission wherein the preservation of uniformity in the motion of the prime mover is a desideratum.

The prime object of the invention is to devise a means for advantageously utilizing as a prime mover, a thermodynamic machine of the first order, whereby power derived from the same may have its range of motion varied within wide limits commensurate with its initial effort to start into a state of motion under a load, and to this end, I have directed my attention particularly to prime movers involving the internal combustion principle embraced in that class of motors known as explosive engines as a type of motor possessing perhaps characteristic features which render it more self contained or portable than any of the prime movers known in the art of mechanical engineering. These classes of motors, however, are conservative in their operation. They do not favor any considerable fluctuation in the speed of the crankshaft, they require to be started by some contributory means and do not start therefore, under a load. In considering the attending disadvantages of these operating conditions, which require to be observed in the utility of motors of this character, I have considered the part which a secondary motive power apparatus might play when suitably disposed in effecting a somewhat wide range of flexibility in the transmission of such conservative power to the different kinetic instrumentalities upon which a varying power, such for example as that required in the propulsion of vehicles, would be an imperative feature and to this end, I have succeeded in devising a transmission for the power of a prime mover, which consists in impressing upon a liquid, an elastic tension through an elastic medium by transmitting the energy of the prime mover through the same and then in liberating this potential energy of the liquid by permitting its escape through that character of a motor wherein considerable liberality in its angular velocity and torsional effort is a feature. Motors of the character of turbine, impact wheels or electrodynamic machines are characterized by these features.

In carrying my invention into practice, I have illustrated in the side elevational view, a motor vehicle having a motive power apparatus according to my invention depicted in Figure 1, while in Fig. 2, I have shown the general arrangement of the parts involved in my improved system of power transmission, in plan. In Fig. 3, I have illustrated diagrammatically, a means whereby the control of the hydrostatic fluid may be readily effected when considered in connection with the descriptive matter in this specification to be hereinafter referred to. Fig. 4 is a detail sectional elevation of one form of safety or relief valve.

In considering the different instrumentalities illustrated in the figures aforesaid, A, A', denote two of the usual type of internal combustion motors set in reciprocal positions with their crank centers one hundred and eighty degrees apart.

B is a hydraulic pump having its suction ends $b$, connected with the cooling-jacket C, C', of the aforesaid combustion motors and supply tank D. The pump B being connected with the power-shaft of the said combustion motors, is of that type known as a rotary screw-pump, though any suitable form of hydraulic pump would answer equally as well, and upon the same being rotated by the operation of the combustion motors A, A', the water or other liquid contained in the tank D, would be drawn normally through the pipe connections to cooling-jacket C' and pipe connection branched to cooling-jacket C.

The pump B may be of the type shown in patent to W. B. Quimby, No. 529,837, dated Nov. 27, 1894, and needs no detailed illustration herein.

The circulation of water taken from the supply tank D, through the cooling-jacket C, C', by their pipe connections, will be into the suction pipe $b$, and thence delivered by way of the delivery-pipe $d$, to the pressure-tank or accumulator E.

In order to create a pressure of an elastic nature within the accumulator E, I provide a bell F for containing a quantity of air, and pump B, will compress the air contained in the bell F and upper part of the accumulator so as to re-act upon the water contained in the accumulator E, after the stop-valve $d'$, which commands the delivery of the pump B, has been shut off. It is obvious, however, that as long as the pump continues to operate so as to force the liquid into the accumulator E against the pneumatic pressure contained within the bell F and its concomitants, or that surplus of air which might be contained above the water level in the accumulator E, energy developed by the operation of the combustion motors A, A', will be accumulated in the tank E. The tank E, or accumulator, and the bell F, therefore, constitute a secondary power accumulator, absorbing its energy from the combustion motors A, A'. As a secondary motor, to which power is transmitted to the axle G, of the vehicle, I employ a number of impact water-wheels $g$, $g'$, $g''$, $g'''$, operated by jets emanating from the nozzles $h$, $h'$, $h''$, $h'''$, and controller H. The arrangement of these jets is with respect to the controller, such as to constitute a stop-cock whereby, upon the rotation of the cylindrical cock H' by the lever H'', the jets are sucessively brought into independent communication with the accumulator by means of the connection H''' after the manner of the usual stop-cock.

The apertures for the several nozzles extend diametrically through the cylindrical cock H', and are in a diagonal series so that a limited turning of the cock in the appropriate direction will establish communication between the nozzle $h$, and the accumulator E; a further limited turning movement will cut-off the communication just described; and establish one between the nozzle $h'$, and said accumulator and so on successively with respect to the nozzles $h''$, $h'''$. The diagram, Fig. 3, respresents the relative positions of the apertures $i$, $i'$, $i''$, $i'''$, in the cock H', and provide for the four nozzles $h$, $h'''$, respectively, the positions of which latter are indicated by the smaller dotted circles, there being no such circle for the nozzle $h$, for the reason that the latter is obscured by the registering position of the aperture $i$, provided therefor. The larger full line circle $i^x$, designates the aperture for the reversing nozzle $j$, the relation of which is indicated by the contiguous larger dotted circle.

It will be observed by the arrangement of the nozzles aforesaid, that the impact wheels, $g$, $g'$, etc., may be made operative independently whereby those of the larger diameter, such as $g$, may be employed when a considerable amount of torque is required with a corresponding diminution in angular velocity while the smaller impact wheel $g'''$, may be utilized to the exclusion of the remaining wheels when high angular velocity is a desideratum regardless of torque. It will be observed thus far that the operation of the secondary motor, comprising the aforesaid impact wheels, has but a uni-directional motion and in order to reverse the motor, I provide a reversing nozzle $j$ which conveys a jet of water under pressure from the accumulator E against the large reversing impact-wheel $j'$, so as to operate the same in a reverse direction. In the event of the cooling-jackets C, C' having a greater circulation of water through them than that which is necessary to maintain the proper working temperature for the combustion motors A, A', I provide a by-pass connection K and stop-valve therefor, whereby communication between the suction connection $b$ of the pump and the tank D may be established direct and by throttling the supply of water from the tank D, as it passes through the by-pass connection K by means of the aforesaid stop-valve, I am enabled to regulate the flow of water through the water jackets C C' together. For independent regulation for either the water-jacket C or the water-jacket C', I provide two throttling or stop-valves $k$, $k'$ and by this arrangement of pipe connections and valves for the suction connection $b$, I am enabled to control the circulation of water through both of the water jackets C, C', together or independently.

When the primary and secondary power system is operating under normal conditions of load, that is when the secondary motor is absorbing energy from the accumulator at the same rate at which the energy of the prime mover is being supplied to the accumulator E, the water issuing from the jets, $h$, $h'$, &c., will be delivered to the tank D in such quantities as the pump B will deliver during equal intervals of time to the accumulator E and thus a constant pneumatic pressure in the bell F and clearance-space of the accumulator, will be maintained. The thermic effect, however, of the water pumped into the accumulator E as it circulates through the heated water-jackets, C, C', while the combustion motor is in operation, will be to increase the air pressure in the accumulator in proportion to the rise in temperature of the liquid contained in the accumulator minus the loss of heat due to radiation. The quantity of air however, taken into the accumulator, must be more than that which could exist when taken into the latter at normal atmospheric pressure and to effect this surplus of air, a quantity of the same must be pumped up first into the accumulator under pressure prior to the water being forced in by the pump B, the object of this being to provide a large surplus of air under pressure so as to afford sufficient reserve, commensurate with volume in the accumulator E. The amount of power stored in the accumulator is sufficient to operate the motor after the pump has ceased to operate, for a considerable period of time, and the accumulator is made of sufficient capacity to accomplish this result. In light loads however, and when the secondary motor is receiving but little water from the accumulator E, the pressure in the accumulator E will rise to a critical value, and as a means for obviating this difficulty, I provide a safety-valve L which opens upon a predetermined increase of pressure beyond that of the normal in the accumulator E, so as to permit of a discharge of water into the tank D so as to constitute a sort of overflow or safety-valve for the accumulator E, and in the event of too great a supply of water being discharged into the tank D by the elastic pressure of the accumulator E, I provide a by-pass connection $l$ and stop-valve which delivers the water directly to the water-jackets C, C' or the suction $b$ of the pump through the by-pass connection K direct. By this arrangement, I am enabled to keep the combustion motors A, A', operating at a constant speed though the mechanism through which the power is transmitted to the axle of the vehicle may be at rest without having to have resort to the usual coupling mechanisms, such as friction clutches and the like.

Reduction gearing is provided, which consists of a small pinion $m$ carried on the shaft of the impact wheels and meshing with a large gear $n$ fixed to the axle of the vehicle.

The safety or by-pass valve L may be set at such a pressure relative to the power of the engine, that when the pressure in the accumulator is such as to raise the same, the engine driving the pump will slow down due to the load, and thereby run slowly while the by-pass valve is raised and thus save fuel.

It will be noted that the motors may run free in going down grade, as the pump and impact wheels are not mechanically connected, and since there are no pistons, or water to be driven thereby, the motors will not act as a brake on the vehicle, as would be the case in other forms of motors.

As a means for automatically controlling the cock H', by the speed of the vehicle, whereby the hand regulation above referred to may be supplemented, I provide a centrifugal governor M coupled up with the motor shaft with a system of bell-crank levers and links as clearly shown in the plan Fig. 2, with a segmental rack N, which engages a pinion O secured to the cock H' in a manner whereby the centrifugal force of the governor M upon the rotation of the secondary motor, will swing the segmental rack N into a position whereby the cock H' will be rotated in the manner already described for the operation of the same by the levers H'' thereby turning on a jet either to the large impact wheel $g$, the intermediate impact wheel $g'$ or the smaller impact wheel $g'''$, according to the amount of centrifugal force imparted to the segmental rack N by the governor M. The action of the governor will have the effect of bringing the cock H', and the operating lever connected therewith into a new position, upon the operator releasing the hand lever, and in the event of the latter being manipulated while the torsional force due to the governor is upon the cock H', the twisting force upon the hand lever will indicate the acceleration of the vehicle either negative or positive. It will be thus understood by this feature of my invention, that I am enabled to maintain a constant speed for the vehicle through the instrumentality of the governor in the event of the vehicle not being under the control of the operator. This will be found of considerable value when it is desired to have the hands of the operator free while the car is being propelled on an even road at a mean velocity.

Having fully described my invention so that those skilled in the art could apply and use the same, what I claim as new and desire to secure by Letters Patent, is—

1. In power transmitting apparatus, the combination of an accumulator of sufficient capacity to act as a storage of power as set forth, means for delivering liquid to said accumulator, a motor in operative relation with respect to the accumulator and embodying a plurality of rotary power elements of different diameters with respect to each other, nozzles coactive with said power elements and capable of a uniform jet velocity, and provision for independently placing said nozzles in communication with the accumulator.

2. In power transmitting apparatus, the combination of an internal combustion engine having a liquid-cooled cylinder, an accumulator, a pump driven by the engine and having its intake communicating with the liquid space of said cylinder and its discharge delivering to the accumulator, a motor comprising a plurality of impact wheels of relatively different diameters, provision for actuating the motor by the liquid supplied from the accumulator, and means for conveying the liquid back to the engine cylinder.

3. In power transmitting apparatus, the combination of an internal combustion engine having a liquid-cooled cylinder, an accumulator, a pump driven by the engine and having its intake communicating with the liquid-space of said cylinder, and its discharge delivering to the accumulator, a motor embodying a plurality of rotary elements of relatively different diameters assembled together, nozzles coactive with said elements, means for independently placing the nozzles in communication with the accumulator, and means for conveying the liquid back to the engine cylinder.

4. In power transmitting apparatus, the combination of an accumulator, means for delivering liquid to said accumulator, a motor embodying a series of rotary power elements of different diameters and also reversing provision, a corresponding series of nozzles, and a revoluble cock common to all the nozzles and containing differentially located apertures adapted upon the turning of the cock to successively and independently bring the apertures into position with respect to their nozzles and thereby independently place each of the latter in communication with the accumulator.

5. In power transmitting apparatus, the combination of a prime mover and a secondary hydraulic power apparatus involving a plurality of impact wheels on a single shaft, an accumulator and means operable by the prime mover for providing the accumulator with a hydraulic power medium, said impact wheels being relatively of different diameters, a controller for delivering said power medium to either of said wheels at approximately the same force, whereby the speed and torque of the said power shaft may be varied through said plurality of wheels by said controller while an approximate constant efficiency of conversion of static into kinetic energy of said secondary power apparatus is maintained.

6. In power transmitting apparatus, the combination of an accumulator, means for delivering liquid to said accumulator, a motor embodying a series of power elements of different diameters, means for delivering fluid from said accumulator to either of said power elements, and means for controlling the delivery of said fluid.

7. In power transmitting apparatus, the combination of an accumulator, means for delivering liquid to said accumulator and storing the same under pressure therein, a motor embodying a series of power elements of different diameters, means for delivering fluid from said accumulator to either of said power elements, means for controlling the delivery of said fluid, and means for re-using the same fluid for the purpose of transmitting power.

8. The combination of the running gear of a vehicle, an engine mounted thereon, a pump driven by said engine, an accumulator, a motor embodying a series of rotating members of varying diameters, and means for driving said running gear through the instrumentality of said motor.

9. In combination, a vehicle, an engine mounted thereon, an accumulator, a pump driven by said engine and adapted to compress fluid in said accumulator, a motor comprising impact wheels of varying diameters adapted to receive fluid from said accumulator, a reducing gear connecting said motor to a driving wheel of the vehicle, and means for controlling the flow of fluid from said accumulator to said motor.

10. In combination, a vehicle, an engine mounted thereon, a pump driven by said engine, an accumulator, a series of motors having different power capacities relative to each other, an elastic and a liquid medium for actuating either of said motors through the instrumentalities of the engine, pump and accumulator, means for controlling the operation of said motors, and means for transmitting the power generated by the engine, through the motors to a wheel of the vehicle.

11. A rotary prime mover having several rings of vanes or buckets all rotatable at the same angular velocity but at various peripheral velocities, with automatic mechanism for directing fluid under pressure successively to different rings of vanes, substantially as described.

12. In a motor, the combination of impact wheels of relatively different diameters, means connecting said wheels together, and means for conducting an actuating agent to said wheels.

13. In a motor, the combination of impact wheels of relatively different diameters fixed to a common shaft, and means for conducting an actuating agent to each of said wheels.

14. In power transmitting apparatus, the combination of an accumulator, means for establishing a predetermined elastic pressure and thereafter introducing a liquid within said accumulator whereby the liquid will be impressed by said elastic pressure, a motor comprising impact wheels of relatively different diameters, and provision for actuating said motor by the liquid supplied from the accumulator.

15. In power transmitting apparatus, the combination of an accumulator, means for establishing a predetermined elastic pressure and thereafter introducing a liquid within said accumulator whereby the liquid will be impressed with said elastic pressure, a motor in operative relation with respect to the accumulator and comprising a plurality of rotary power elements of relatively different diameters, nozzles coactive with each of said power elements, and means for independently placing the nozzles in communication with the accumulator.

16. In combination, a vehicle, an engine mounted thereon, an accumulator constructed to subject the liquid contained therein to elastic pressure, a pump driven by said engine and adapted to compress fluid in said accumulator, an impact motor adapted to receive fluid from said accumulator, a reducing gear connecting said motor to a driving wheel of the vehicle, and means for controlling the flow of fluid from said accumulator to said motor.

17. In combination, a vehicle, an engine mounted thereon, a pump driven by said engine, an accumulator constructed to subject the liquid contained therein to elastic pressure, an impact motor, means for actuating said motor by the agent stored in said accumulator, means for reversing the motor, means for controlling the speed of the motor, means for driving the vehicle through the instrumentality of the motor, comprising reducing gear between the motor and the driven wheel of the vehicle, the motor and running gear being mechanically disconnected from the engine and pumping mechanism.

18. In a power transmitting apparatus, the combination of an accumulator, means for establishing an elastic pressure and thereafter introducing a liquid within said accumulator whereby a liquid will be impressed by said pressure, a motor having impact wheels of relatively different diameters, means for conducting the liquid to one of said wheels and delivering the same at the periphery thereof, and means for cutting off liquid from said wheel and conducting the liquid to another of said wheels.

19. In combination, a vehicle having a running gear, an accumulator, means for establishing an elastic pressure and thereafter introducing a liquid within said accumulator whereby the liquid will be impressed by said elastic pressure, an impact motor having a number of wheels of relatively different diameters, provision for actuating said motor by the liquid supplied from the accumulator, provision for reversing the direction of rotation of said motor, means for controlling the delivery of liquid to said motor, means for conveying the liquid after it passes the motor, back to the first named means, and means for reducing the speed between the motor and the running gear.

20. A rotary prime mover having several rings of vanes all rotatable simultaneously at the same angular velocity but at various peripheral velocities; with mechanism for directing fluid under pressure to different rings of vanes, substantially as described.

21. A rotary prime mover having several rings of vanes of different diameters; with automatic mechanism for directing fluid under pressure to different rings of vanes, substantially as described.

22. A rotary prime mover having several rings of vanes of different diameters; with mechanism for directing fluid under pressure successively to the different rings of vanes, substantially as described.

23. In combination a prime mover comprising a series of impact wheels or elements of relatively different diameters, and means for directing impelling fluid to any one of the impact wheels.

24. In combination a prime mover comprising a series of impact wheels or elements of relatively different diameters, a device for directing fluid to any one of the impact wheels, and automatic means controlling the position of said device.

25. In combination a prime mover comprising a series of impact wheels or elements of relatively different diameters, means for directing fluid to any one of the impact wheels, and a governor for controlling the position of said means.

26. In combination a motor embodying a plurality of rotary elements of relatively different diameters, and means for directing a jet of fluid to any one of said elements.

27. In combination a motor embodying a plurality of rotary elements of relatively different diameters, and means for directing a jet of fluid successively to said elements.

28. In combination a motor embodying a plurality of rotary elements of relatively different diameters, means for directing a jet of fluid successively to or against said elements, and a governor for automatically varying the position of said jet.

29. In combination a motor embodying a plurality of rotary elements of relatively different diameters, means for directing a jet of fluid to any one of said elements, and means for generating said jet of fluid.

30. In power transmitting apparatus, the combination of a fluid pump, a motor comprising impact wheels of relatively different diameters, and provision for actuating said motor by fluid supplied from the pump.

31. In power transmitting apparatus, the combination of a fluid pump, a motor embodying a plurality of rotary power elements of relatively different diameters, nozzles co-acting with said power elements, and means for independently placing said nozzles in communication with the pump.

32. In power transmitting apparatus, the combination of a fluid pump, a motor comprising a plurality of rotary power elements of relatively different diameters, nozzles respectively co-acting with said power elements, and means for placing any nozzle in communication with the pump.

33. In power transmitting apparatus, the combination of an internal combustion engine having a fluid cooled cylinder, a fluid pump driven by the engine and having its intake communicating with the fluid space of said cylinder, a motor comprising a plurality of connected power wheels of relatively different diameters, means for directing the fluid supplied from the pump successively against the power wheels, and means for conveying the fluid back to the engine cylinder.

34. In power transmitting apparatus, the combination of an internal combustion engine having a fluid cooled cylinder, a fluid pump driven by the engine and having its intake communicating with the fluid space of said cylinder, a motor embodying a plurality of connected rotary elements of relatively different diameters assembled together, means for directing fluid from the pump successively to said rotary elements, and means for conveying the fluid back to the engine cylinder.

35. In power transmitting apparatus, the combination of a pump, a motor embodying a series of rotary power elements of different diameters, and also reversing provision, a corresponding series of nozzles, and a revoluble cock common to all the nozzles, and containing differentially located apertures adapted upon the turning of the cock to successively and independently bring the apertures in position with respect to their nozzles and thereby independently place each of the latter in communication with the pump.

In testimony whereof, I have signed my name to this specification, in the presence of two subscribing witnesses.

FRANK M. ASHLEY.

Witnesses:
PHILIP K. STERN,
HELEN E. MAHER.